(12) United States Patent
Kochsmeier et al.

(10) Patent No.: US 6,260,542 B1
(45) Date of Patent: Jul. 17, 2001

(54) FUEL SUPPLY SYSTEM

(75) Inventors: Christian Kochsmeier, Dortmund; Peter Andreas Löw, Robdorf, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/495,598

(22) Filed: Feb. 1, 2000

Related U.S. Application Data

(63) Continuation of application No. PCT/EP98/04830, filed on Aug. 3, 1999.

(30) Foreign Application Priority Data

Aug. 6, 1997 (DE) .............................................. 197 33 949

(51) Int. Cl.$^7$ .................................................. F02M 37/04
(52) U.S. Cl. ........................................... 123/509; 137/571
(58) Field of Search .................................... 123/509, 510, 123/514; 137/565.17, 565.34, 571, 576

(56) References Cited

U.S. PATENT DOCUMENTS

| | | | |
|---|---|---|---|
| 4,716,931 | 1/1988 | Shibamoto | 137/558 |
| 4,951,699 * | 8/1990 | Lipman | 137/142 |
| 5,107,889 * | 4/1992 | Sasaki et al. | 137/574 |
| 5,139,000 * | 8/1992 | Sawert | 123/514 |
| 5,197,445 * | 3/1993 | Casari | 123/514 |
| 5,431,143 * | 7/1995 | Brown | 123/514 |
| 5,452,701 * | 9/1995 | Tuckey | 123/509 |
| 5,469,829 * | 11/1995 | Kleppner et al. | 123/514 |
| 5,647,328 * | 7/1997 | Fournier et al. | 123/509 |
| 5,762,048 * | 6/1998 | Yonekawa | 123/514 |
| 6,021,988 * | 2/2000 | Frank et al. | 248/346.03 |
| 6,058,911 * | 5/2000 | Hashimoto et al. | 123/514 |
| 6,164,267 * | 12/2000 | Okada et al. | 123/510 |

FOREIGN PATENT DOCUMENTS

| | | |
|---|---|---|
| 8033230 | 5/1981 | (DE) . |
| 3582090 | 10/1986 | (DE) . |
| 4023037 | 1/1992 | (DE) . |
| 1055361 | 3/1986 | (JP) . |

* cited by examiner

*Primary Examiner*—Carl S. Miller
(74) *Attorney, Agent, or Firm*—Richard A. Speer; Mayer Brown & Platt

(57) ABSTRACT

In a fuel supply system with a main tank (1), with a splash pot (4), with a pump (7) fed from the splash pot and with connecting lines (5, 18) for the pump, according to the invention the latter is arranged in the main tank (1) outside the splash pot (4) and is connected to the latter via at least one suction line (5) integrally formed fixedly onto an inner wall (3) of the main tank. It is particularly advantageous if that portion of the forward-run line (18) which is to be connected to the pump is also integrally formed fixedly onto the inner wall, because the pump can then be fluidically connected very simply and quickly by being plugged on. As a further option, the electric connection (24–27) of the pump can also be made in one operation with the fluidic contacting.

14 Claims, 1 Drawing Sheet

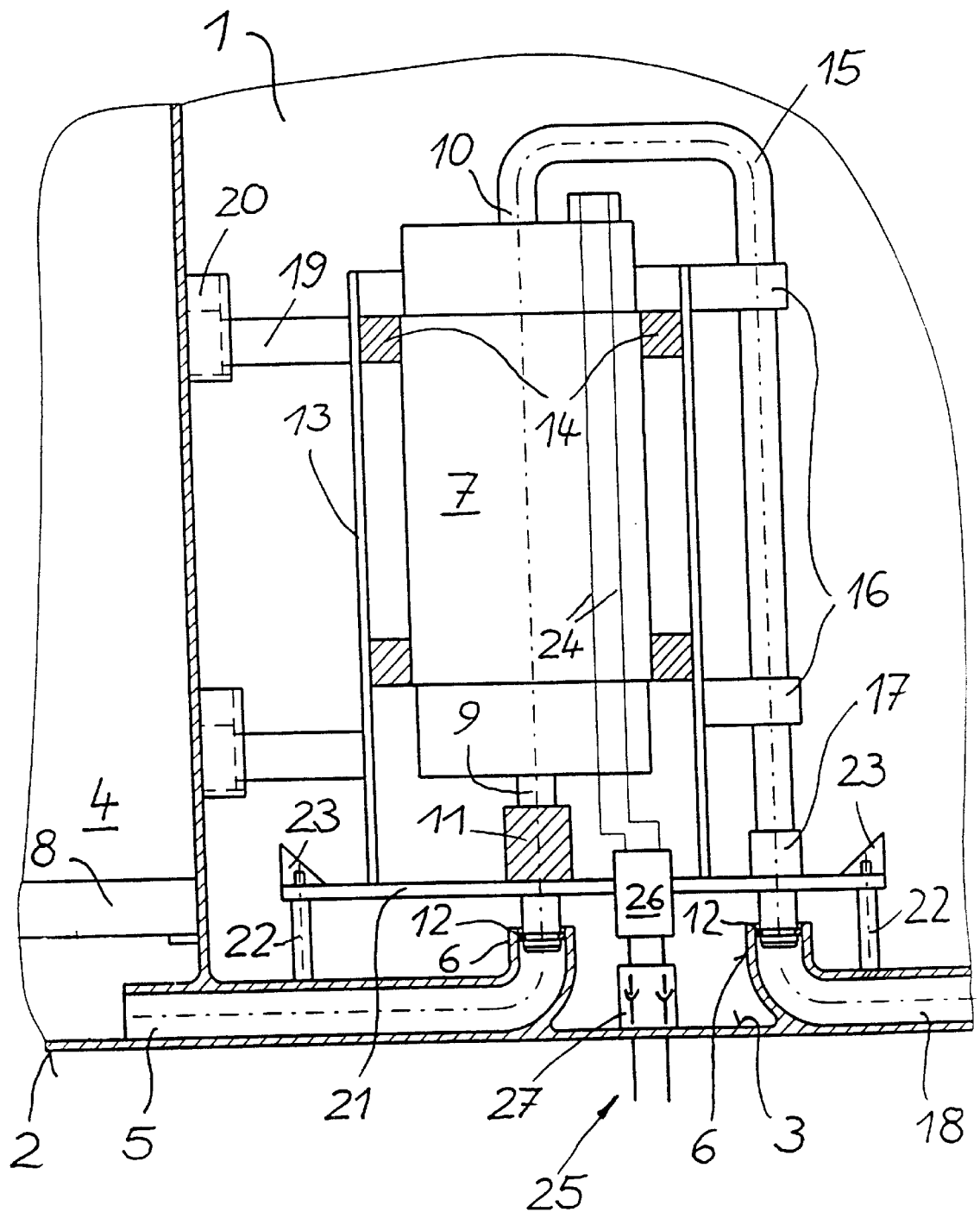

FUEL SUPPLY SYSTEM

This application is a continuation of applicant's co-pending application PCT/EP 98/04830, with an international filing date of Aug. 3,1999, now abandoned, which application was based on the parent German application 197 33 949.2.

BACKGROUND OF INVENTION

The invention relates to a fuel supply system having operative parts that are integrally formed with respect to each other.

Many different versions of fuel supply systems are known. They all comprise a container or main tank, a (fuel) pump and usually also a splash pot (often called a calming vessel or reservoir), from which the pump sucks up. The splash pot is preferably filled, usually by means of a suction jet pump which, in turn, may be fed from the forward run of the pump or from a fuel return.

The pump is often arranged directly in the splash pot, sometimes even combined with the latter to form a fuel feed unit (DE 35 10 890 C2). The latter is introduced, complete, through a recess provided in the tank ceiling and is fastened to the recess edge by means of a closing cover. The splash pot, together with the pump, is led as near as possible to the tank bottom and supported on the latter.

In modern motor vehicles, there is less and less space left for the clear height of the tanks which, instead, have to be wider in order to maintain a sufficient volume. This gives rise to increased splashing movements of the tank content in the plane of the roadway during accelerations. In order, then, to ensure a satisfactory supply of fuel to the pump and engine under all conceivable driving conditions, a large splash pot volume must be provided. However, this can be implemented reasonably only if the splash pot is of relatively great height.

Furthermore, in light of increasingly stringent emission protection regulations, the aim is, if possible, to minimize the number of potential leakage points in the fuel supply system. Attempts are therefore also made to dispense with said recess for introducing the fuel feed unit and, instead, to introduce the latter through the filler orifice which is present in any case. As a result of this, however, there is a conflict between the requirements, on the one hand, of providing as high a splash pot as possible, but, on the other hand, also of having the possibility of exchanging the pump at any time. If the splash pot reaches near to and just below the tank ceiling, the pump can no longer be demounted separately.

DESCRIPTION OF RELATED ART

A fuel supply system is already known (DE 80 33 230 U1), in which the splash pot is virtually at the same height as the clear height of the tank. The pump is arranged outside the splash pot and the tank and fed via a separately laid suction line. The splash pot, designed as a structural unit with a filling level indicator, is introduced into the main tank through a lateral orifice having a large free cross section.

[An] older patent application 197 29 261.5 describes the production of line sections which are shaped in one piece with the half shells of an injection-molded tank which, in particular, may also be designed as a suction line fixed with respect to the tank inner wall. As is known, in contrast to the blow-molded tanks in widespread use today, injection-molded tanks are produced from two half shells which, after all the necessary fittings have been mounted on the half shell inner walls, are assembled together sealingly by means of a continuous weld seam.

OBJECTS OF THE INVENTION

An object of the invention is to design a fuel supply system of the type discussed initially, in such a way that it becomes simpler to mount it.

This object is achieved, according to the invention, by integrally forming certain portions fo the full supply system as set forth below.

BRIEF SUMMARY OF THE INVENTION

When the pump is arranged in the main tank outside the splash pot and is connected to the latter via at least one suction line that is integrally formed onto an inner wall of the tank, on the one hand the free cross section of the introduction orifice can be reduced. On the other hand, the fluidic connection between the splash pot and pump is made simply by plugging the pump onto the fixed line end, if the pump has at least one pluggable fluidic connection.

It is possible, on the one hand, to introduce the splash pot (prefabricated loose) into the tank separately from the pump. It is particularly advantageous, however, for mounting purposes, if the splash pot or its continuous side wall is fixedly connected to the tank bottom, in particular is injection-molded in one piece with the latter and fixedly connected fluidically to the suction line. The splash pot can then also be erected virtually as far as the tank ceiling, as initially required, without being subjected to any restriction by the size of an introduction orifice. At the same time, dispensing with a separate bottom for the splash pot saves material and gains volume.

Expediently, the short suction line will, on the one hand, open out in the splash pot near the bottom and, on the other hand, have an opening near the inner wall, in particular the bottom, of the main tank, so that no special manual mounting operations become necessary here and no undesirable pressure drop occurs on the suction side of the pump. If the splash pot is injection-molded on fixedly, leaks between the latter and the suction line are virtually ruled out.

In a particularly advantageous way, that section of the forward-run line which is directly connected to the pump will also be connected fixedly to the inner wall of the main tank. Fixed distances between the openings of the suction line and forward-run line are thus defined.

Preferably, the opening of the suction line projects at a predetermined fixed angle from the inner wall, so that the corresponding pump connection piece can simply be plugged on. If the forward-run opening is caused to project from the inner wall in the same direction as the opening of the suction line, a particularly efficient mounting of the pump is achieved, because, by means of only a few manual operations, the latter can be plugged on and contacted fluidically on both sides.

If, furthermore, the suction and forward-run connections of the pump open out at a corresponding distance from one another on the same side of the pump casing, said side facing the tank inner wall, the pump can be plugged onto the fixed line openings in a very simple way and is consequently immediately connected fluidically.

It is known per se to branch off a part feed quantity of the pump as a propellant jet of a suction jet pump, by means of which the splash pot is constantly refilled from the main tank. In a further addition to the idea of the invention, a line injection-molded on fixedly may likewise be provided on the tank inner wall for the third pump connection required for this purpose.

If longer line sections cannot be or are not to be injection-molded on in one piece, at least their connecting openings will be injection-molded on fixedly, so that their position remains permanently predetermined unequivocally, and said openings will be connected to one another by means of additional hoses or the like.

The pluggable fluidic connections may be sealed off by means of commercially available sealing rings. The dimensional tolerances of line openings injection-molded on are low if they are appropriately shaped. With a view to the exchangeability of the pump by unplugging it and plugging in a replacement pump, the seals will be provided on the pump side and on the connection piece side, so that, if appropriate, they can be checked and replaced in a simple way.

Mounting is simplified even further if the electric connections of the pump are also located on the same casing side as the fluidic connections and corresponding electric feed contacts are provided on the tank inner wall. This is because all the pump connections required can then be made by plugging on in one manual operation. There is, in technical terms, no problem in also injection-molding electric connections in an injection-molded tank wall so that they are in a defined position with respect to the fluidic connections.

In addition to mechanical coupling via the connections, further fixing means will, of course, also be provided, in order to hold the pump permanently, but releasably, on the tank inner wall. These may be, for example, interlocking means which are provided, on the one hand, fixedly on the tank inner wall and, on the other hand, on the pump or on its casing and, if appropriately, are in close spatial proximity to the openings of the fluid lines and to the electric connections.

The pump casing itself could, of course, be provided as a monobloc with all the required connections and supporting and fixing means. If, however, the pump does not have to be adapted as a large-series structural part to individual tank geometries or connection positions, a skeleton or an adapter will be provided, which, on the one hand, holds the pump and, on the other hand, combines and positions all the required connections on one side so as to match the positions predetermined on the tank. Any conventional longitudinal-flow pump, having suction and forward-run connections emerging on opposite casing sides, may then also be used according to the invention, for example, in which case the forward run, usually located on the top side, is internally connected to the pluggable forward-run connection of the adapter via a short intermediate line.

Since the pump will, in any case, have to be arranged near the splash pot, fastening elements for fixing the pump or the pump structural unit may be provided on the wall of said splash pot. These elements are preferably to be designed as sliding guides, by means of which the mounting operation is further assisted and, in particular, the pump is necessarily installed in the correct position.

If required, damping elements will be provided in a way known per se between the pump and its tank-side holding means, in order to minimize the transmission of structure-borne noise.

Further details and advantages of the subject matter of the invention may be gathered from the drawing of an exemplary embodiment and the following detailed description thereof.

DETAILED DESCRIPTION OF THE INVENTION

The single FIGURE shows diagrammatically a cross section through a fuel supply system in the region of the splash pot and of the fuel pump. A main tank 1, only a detail of which is shown, consists essentially of a lower half shell 2, which forms a tank bottom 3, and of an upper half shell, not shown here, which forms the tank ceiling. Both half shells, after being manufactured by the plastic injection molding method, are assembled together sealingly at their outer edge to form the complete tank with inner walls facing one another, preferably by means of a weld seam running along the parting plane. The division of the half shells which is referred to above is, of course, not mandatory. A different arrangement of the parting plane may also be chosen, for example a vertical run, if this seems to be expedient. As regards the production of the tank, reference may otherwise be made to the older application mentioned.

A splash pot 4 or its continuously closed side wall is injection-molded in one piece onto the inner wall of the half shell 2 or onto the tank bottom 3. The bottom of said splash pot is therefore directly a portion of the inner wall of the half shell 2. Likewise integrally formed on in one piece is a short suction line 5 which, on the one hand, opens out in the bottom region of the splash pot and, on the other hand, passes through the wall of the latter and has an opening 6 projecting a short distance from the tank bottom 3 at right angles. The advantage of this arrangement is that the suction line does not have to be led outward through the tank wall. The opening in the splash pot is parallel to the bottom for the optimum utilization of residue.

As is known, a splash pot is provided as a preferably filled reservoir, from which a fuel pump 7 arranged next to the splash pot 4 here is fed via the suction line 5. The upper edge, which cannot be seen here, of the splash pot 4 extends into the vicinity of the tank ceiling. Consequently, even when the splash pot has a relatively small lateral extent, its volume is sufficiently large for all operating conditions, in particular also in the case of high accelerations and decelerations taking effect in the plane of the roadway, especially since the fuel pump does not take up any volume within the splash pot. On the assumption that the fuel supply is sufficient, the opening of the suction line 5 into the splash pot 4 is always located below the fuel level. A fuel filter 8 extends, upstream of the opening of the suction line 5, over the bottom region of the splash pot 4.

The fuel pump 7, here, is of the conventional axial-flow type, in which the suction connection piece 9 and the delivery connection piece 10 are arranged on casing sides located opposite one another. The suction connection piece 9 is plugged into the opening 6 of the suction line, if appropriate via an elastic intermediate piece 11 serving as a damper and a seal. Said suction connection piece carries on its outer circumference, in a groove, a seal 12 which seals off this plug connection against the ingress of unfiltered fuel on the suction side of the pump 7.

The fuel pump 7 is held in an adapter 13 via damping elements 14. Connected to the delivery connection piece of said fuel pump is a short intermediate line 15 (for example, a corrugated hose). The run of this intermediate line is determined via a plurality of supporting elements 16 of the adapter 13. The intermediate line opening located on the end face and fixed in the adapter radially and axially in a junction piece 17 lies parallel to the opening of the suction connection piece 9. The junction piece is provided with a seal 12 in the same way as the suction connection piece 9 of the pump. Said junction piece is plugged into the opening of a section, integrally formed onto the tank bottom 3 in one piece in the same way as the suction line 5, of a forward-run line 18 which opens out at an exactly defined distance from and parallel to the opening of the suction line 5. This forward-run line, further along, passes through the half shell 2 outward—as regards production reference may be made to the older application already mentioned—, where a follow-up section and, if appropriate, a further filter are then connected. The seal 12 on the junction piece prevents leakages of the plug connection between the junction piece 17 and the forward-run line 18.

Furthermore, the adapter 13 has lateral supports 19 which support it against an adjacent wall in the tank—here against a wall of the splash pot 4. For this purpose, there are integrally formed onto the respective wall preferably fixing means 20 in the form of sliding guides (with a T-groove), the longitudinal axis of which runs parallel to the axial direction of the openings of the suction connection piece 9 and of the intermediate line 14. The supports 19 are equipped on the end face with sliding pieces fitting with the sliding guides.

During mounting, the sliding pieces are inserted into the sliding guides from above and the pump/adapter structural unit is then plugged onto the openings of the lines 5 and 18 injection-molded on. Preferably, the sliding guides and the openings of the lines will not all be laid in a common plane, so as to obtain a spatial support of the adapter and pump. Other fixing means, for example a union nut with a bayonet fastening, may also be provided.

In the embodiment shown, an additional support is also provided, in any case, in which a baseplate 21 of the adapter rests on bottom supports 22 which may be integrally formed onto the tank bottom 3. If required, releasable means, for example screws or interlocking means (for example, clips 23, as indicated), may be provided at these points for the purpose of further securing the fluidic plug connections.

If an exchange of the fuel pump 7 or the seals 12 can be carried out only through a relatively narrow orifice of the main tank when the latter is closed in the final state, then care must be taken, in the choice of means for fixing the fuel pump, to ensure that they can be handled in a simple way.

Contrary to the illustration, the parallel openings of the suction line 5 and of the forward-run line 18 may, if required, also be arranged parallel to or obliquely to the tank bottom, depending on the conditions of space, without thereby departing from the plugging principle. Only the plug-in direction of the adapter or of the pump would be changed as a result.

Moreover, it is also possible, if required, for only the opening regions of the suction line 5 or of the forward-run line section to be injection-molded fixedly onto the lower half shell 2 and the hose lines to be laid between them. It is sufficient, for the intended purpose, if said opening regions are positioned and fixed unequivocally, in particular for the connection of the pump.

In a further addition to this fuel supply system which is extremely easy to mount, the electric connection of the fuel pump (represented by lines 24) is likewise laid into that region of the adapter 13 which faces the tank bottom 3. Specifically, it is also possible, at little outlay, to injection-mold an electric feed connection 25 for the fuel pump into the half shell 2 or the tank bottom 3, in such a way that the contacts of said feed connection are assembled together with corresponding countercontacts 26 of the pump or of the adapter in an electric plug connection 27 simultaneously with the assembly of the fluidic plug connections. This measure is not only highly advantageous during initial mounting, but, in particular, also assists any subsequent exchange of the fuel pump.

What we claim is:

1. A fuel supply system with a main tank (1), with a splash pot (4), with a pump (7) fed from the splash pot and with connecting lines for the pump, wherein the pump is arranged in the main tank outside the splash pot and is connected to the latter via at least one suction line (5), of which at least one opening portion (6) to be connected to the pump (7) is integrally formed fixedly onto an inner wall of the main tank (1).

2. The fuel supply system as claimed in claim 1, wherein the splash pot is arranged fixedly on the tank bottom (3), in particular is injection-molded in one piece with the latter and is fixedly connected fluidically to the suction line (5).

3. The fuel supply system as claimed in claim 1 or 2, wherein the suction line (5) passing through one wall of the splash pot opens out, on the one hand, near the bottom in the splash pot (4) and, on the other hand, near the inner wall, in particular the bottom (3), of the main tank (1) and is integrally formed as a whole fixedly onto the main tank.

4. The fuel supply system as defined in claim 3, wherein, an opening portion 6, to be connected to the fuel pump (7), is integrally formed with a forward-run line (18), fixedly onto the inner wall of the main tank (1).

5. The fuel supply system as claimed in claim 4, wherein the suction line (5) and the forward-run line (18) have parallel openings (6) arranged on the inner wall at a predetermined distance from one another.

6. The fuel supply system as claimed in claim 4, wherein at least one further line to be connected to the pump (7), in particular a feed line for a jet pump for filling the splash pot (4), is also integrally formed, at least in the opening region, onto the tank bottom and likewise has an opening oriented parallel to the openings of the suction line (5) and of the forward-run line (18).

7. The fuel supply system as claimed in one claim 4, wherein the pump (7) is designed as a structural unit with suction and forward-run connections opening out on the same casing side.

8. The fuel supply system according to claim 1, wherein, furthermore in the region of the suction line (5) an electric feed connection (25) of the pump is connected fixedly to the inner wall (3) of the main tank (1) and can be contacted from inside the latter.

9. The fuel supply system as claimed in claim 8, wherein the pump (7) has as a structural unit an electric plug connection (26) for connection to the feed connection, said plug connection (25) being capable of being plugged in in the same direction as the fluid connections of the pump.

10. The fuel supply system as claimed in claim 9, wherein the pump (7) is combined in a structural unit with an adapter (13) which carries, on the one hand, the pump itself and, on the other hand, the required connections (9, 17, 26) in an arrangement in which they are correctly oriented with one another and with the tank-side connections or line openings.

11. The fuel supply system as defined in claim 1, wherein means (20) for fixing the pump (7) are provided on an inner wall of the tank, in particular an outer wall of the splash pot (4).

12. The fuel supply system as defined in claims 11, wherein the fixing means (20) are designed as sliding guides and their axes are oriented parallel to the connections (6) of the suction line (5) and of a forward-run line (18).

13. The fuel supply system as defined in claim 1, wherein releasable holding means (clips 23) for connecting the pump (7) to the tank bottom are provided.

14. The fuel supply system as defined in claim 1, wherein a filter (8) is provided, upstream of the opening of the suction line (5), in the splash pot (4).

* * * * *